US012680499B2

(12) United States Patent
Raju et al.

(10) Patent No.: US 12,680,499 B2
(45) Date of Patent: *Jul. 14, 2026

(54) CYCLONIC SEPARATOR FOR GAS TURBINE ENGINE

(71) Applicant: General Electric Company, Schenectady, NY (US)

(72) Inventors: Sanjay Raju, Bengaluru (IN); Ajay Kumar Verma, Bengaluru (IN); Jonathan Russell Ratzlaff, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/049,033

(22) Filed: Feb. 10, 2025

(65) Prior Publication Data

US 2025/0257691 A1     Aug. 14, 2025

Related U.S. Application Data

(63) Continuation of application No. 18/440,112, filed on Feb. 13, 2024, now Pat. No. 12,392,284.

(51) Int. Cl.
*F02C 7/052* (2006.01)
*F02C 7/18* (2006.01)

(52) U.S. Cl.
CPC ............... *F02C 7/052* (2013.01); *F02C 7/18* (2013.01)

(58) Field of Classification Search
CPC .. B01D 45/12; B01D 45/16; B04C 2003/003; B04C 2003/006; B04C 2009/005; B04C 3/00; B04C 3/06; F02C 7/052; F02C 7/18
See application file for complete search history.

(56) References Cited

U.S. PATENT DOCUMENTS

| | | | |
|---|---|---|---|
| 3,421,296 A | 1/1969 | Beurer, Sr. |
| 3,449,891 A | 6/1969 | Shohet et al. |
| 4,985,058 A | 1/1991 | Prinsloo et al. |
| 5,653,880 A | 8/1997 | Mouton |
| 6,962,199 B1 | 11/2005 | Tjeenk Willink |
| 8,092,145 B2 | 1/2012 | Martel et al. |
| 10,258,917 B1 | 4/2019 | Bradford et al. |
| 10,450,951 B2 | 10/2019 | Rahaim et al. |
| 10,697,372 B2 | 6/2020 | Payne et al. |
| 10,724,437 B2 | 7/2020 | Atsuchi et al. |
| 10,765,980 B2 | 9/2020 | Bisson et al. |
| 10,830,138 B2 | 11/2020 | Manteiga et al. |

(Continued)

*Primary Examiner* — Steven M Sutherland

(74) *Attorney, Agent, or Firm* — McCarter & English, LLP

(57) ABSTRACT

A cyclonic separator for a gas turbine engine includes a housing, a fluid inlet, a first fluid outlet, a second fluid outlet, and a particle separator. The housing includes a first end, a second end, and an outer wall extending between the first end and the second end. The fluid inlet is disposed at the first end of the housing. The first fluid outlet is disposed at the second end of the housing. The second fluid outlet is disposed in the outer wall downstream of the first end of the housing and extends outward at least partially in the radial direction. The particle separator is disposed in the housing between the first end and the second end inward of the outer wall in the radial direction and extends in the circumferential direction. The particle separator defines a plurality of openings extending in the radial direction.

19 Claims, 12 Drawing Sheets

(56)     References Cited

U.S. PATENT DOCUMENTS

| 10,946,975 | B2 | 3/2021 | Ferrier et al. |
| 10,975,731 | B2 | 4/2021 | Manning et al. |
| 11,084,599 | B2 | 8/2021 | Iglewski et al. |
| 11,123,677 | B2 | 9/2021 | Chuh et al. |
| 11,261,789 | B2 | 3/2022 | Menheere et al. |
| 11,473,464 | B2 | 10/2022 | Gover et al. |
| 11,541,340 | B2 | 1/2023 | Stone et al. |
| 11,773,736 | B2 | 10/2023 | Churchill |
| 2015/0224517 | A1* | 8/2015 | Ramalingam ...... B01D 21/0012 210/85 |
| 2017/0101869 | A1 | 4/2017 | Chavez |
| 2018/0135516 | A1 | 5/2018 | Nasir et al. |
| 2018/0291812 | A1 | 10/2018 | Payne et al. |
| 2020/0300163 | A1 | 9/2020 | Osgood et al. |
| 2020/0332711 | A1 | 10/2020 | Owen |

* cited by examiner

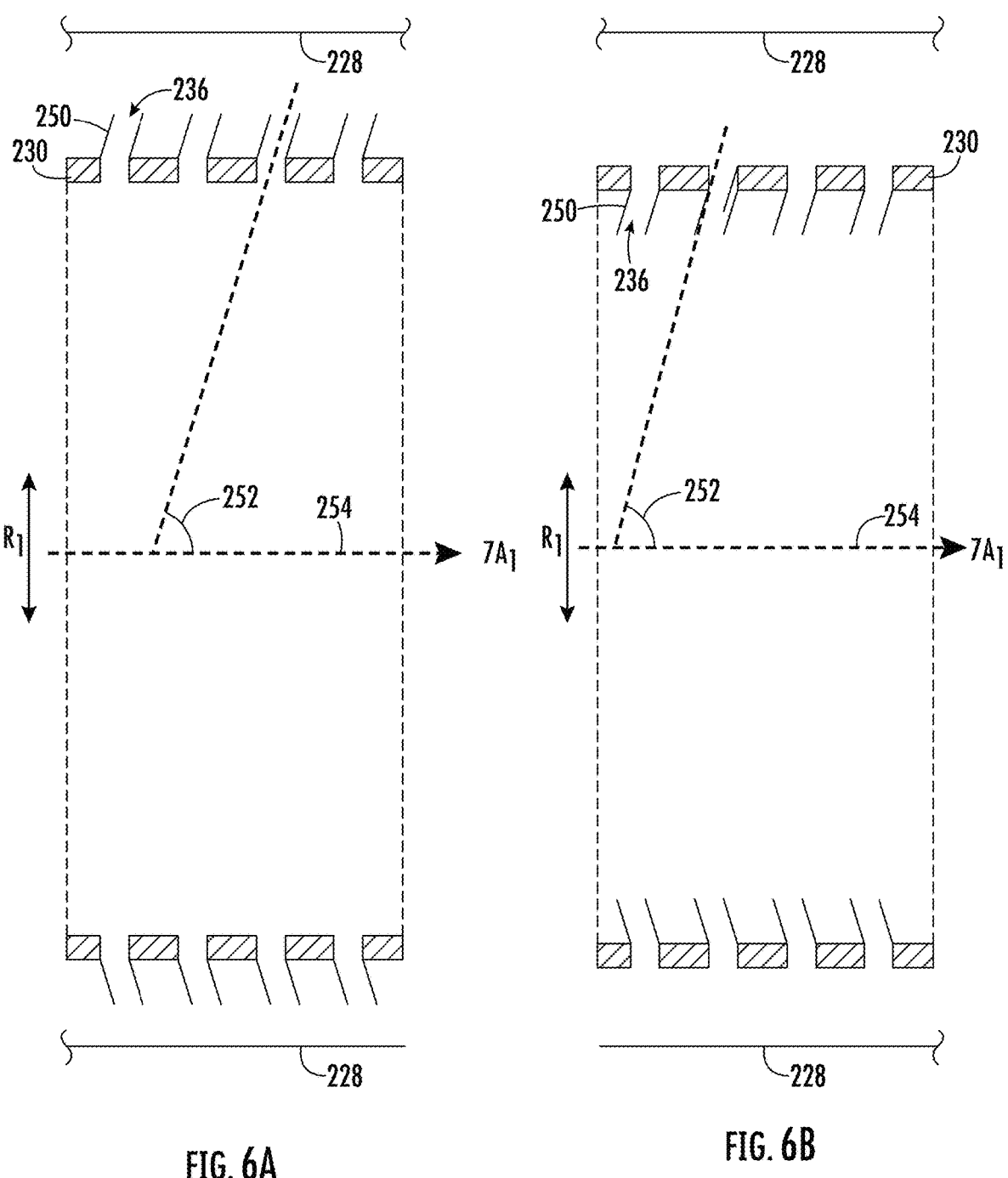
FIG. 6A                  FIG. 6B

CYCLONIC SEPARATOR FOR GAS TURBINE ENGINE

CROSS-REFERENCE TO RELATED APPLICATIONS

This application is a continuation application of U.S. application Ser. No. 18/440,112 filed Feb. 13, 2024, which is hereby incorporated by reference in its entirety.

FIELD

The present disclosure relates to a gas turbine engine, and more particularly to a cyclonic separator for a gas turbine engine.

BACKGROUND

Turbine engines, and particularly gas or combustion turbine engines, are rotary engines that extract energy from a flow of combusted gases passing through the engine onto a plurality of turbine blades. Gas turbine engines have been used for land and nautical locomotion and power generation, but are most commonly used for aeronautical applications such as for aircraft. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, can be necessary. Typically, cooling is accomplished by ducting cooler air from the high and/or low pressure compressors to the engine components that require cooling. While the compressor air is provided at a high temperature, it is cooler relative to the turbine air, and can be used to cool the turbine. When cooling the turbines, cooling air can be supplied to various turbine components, including the interior of the turbine blades and the turbine shroud.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIGS. 6A-6E are cross-sectional views of particle separators with projections.

DETAILED DESCRIPTION

Figure 1:
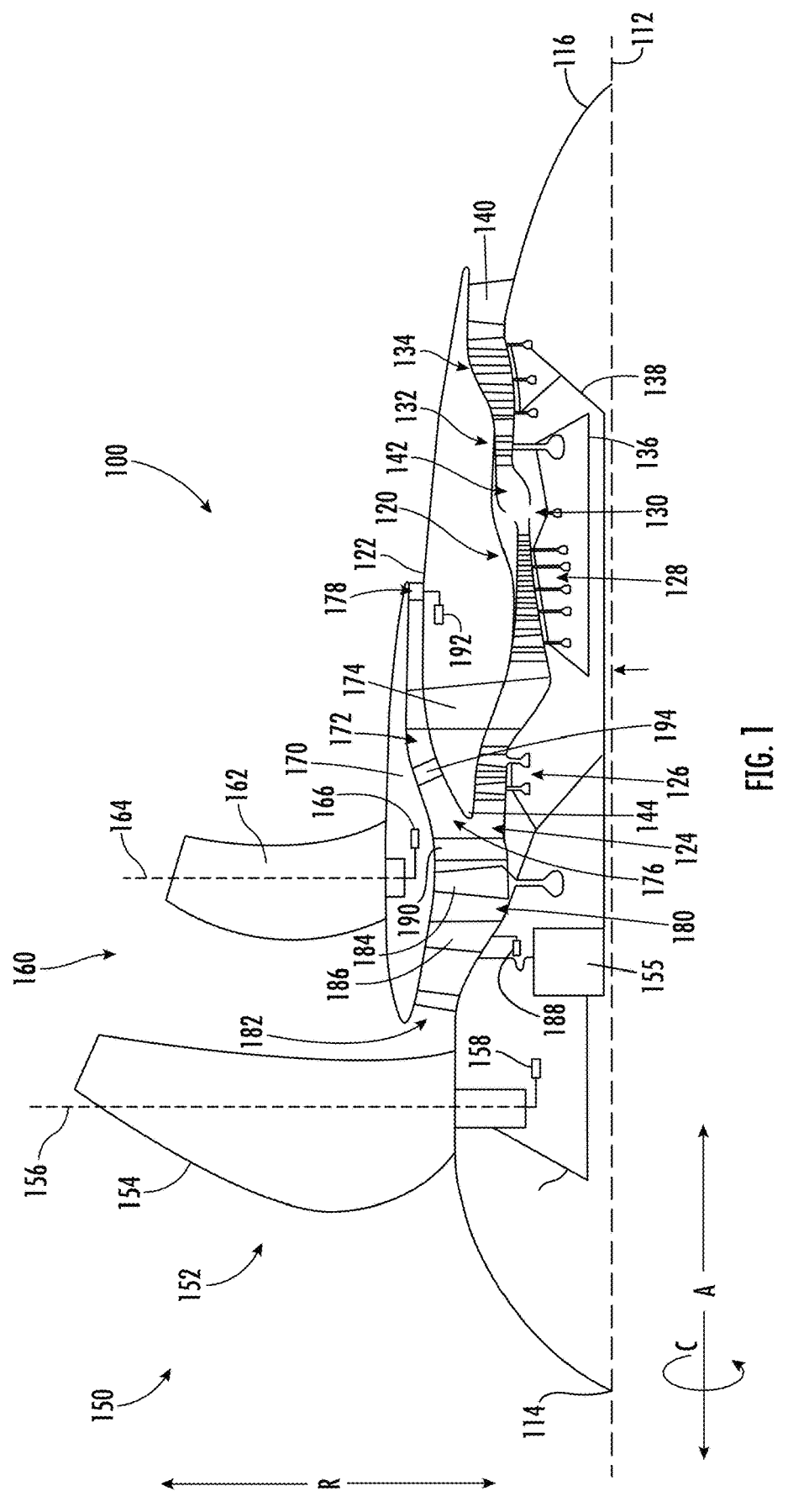
FIG. 1 is a cross-sectional view of an exemplary gas turbine engine.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

As used herein, the terms "first," "second," and other ordinals are used to distinguish one component from another and are not intended to signify location or importance of the individual components.

The terms "upstream" and "downstream" refer to the relative direction with respect to fluid flow in a fluid pathway. For example, "upstream" refers to the direction from which fluid flows, and "downstream" refers to the direction to which the fluid flows.

The present disclosure is generally related to removal of particulate matter from air flows in a gas turbine engine. Air flowing through the engine for cooling various components of the gas turbine engine may accumulate particulate matter. The particulate matter, such as dirt, dust, sand, ash, and other environmental contaminants in the cooling air can cause a loss of cooling and reduced operational time for the aircraft environment. Particles supplied to the turbine components can clog, obstruct, or coat the flow passages and surfaces of the components, which can reduce the lifespan of the components.

To reduce the amount of particulate matter in the cooling air flows, a cyclonic separator swirls air in cyclic motion, applying centrifugal force on the particulate matter. The centrifugal forces push the particulate matter to a radial edge of the cyclonic separator, and a particle separator inhibits movement of the particulate matter back into the swirled air flow. An exit flow removes the particulate matter from the cyclonic separator, and the swirled air flow exits the cyclonic separator to cool the components of the gas turbine engine.

Referring now to FIG. 1, a schematic cross-sectional view of a gas turbine engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire gas turbine engine 100 may be referred to as an "unducted turbofan engine." In addition, the gas turbine engine 100 of FIG. 1 includes a third stream extending from the compressor section to a rotor assembly flowpath over the turbomachine, as will be explained in more detail below.

For reference, the gas turbine engine 100 defines an axial direction A, a radial direction R, and a circumferential direction C. Moreover, the gas turbine engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The gas turbine engine 100 extends between a forward end 114 and an aft end 116, e.g., along the axial direction A.

The gas turbine engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor (referred to herein as an LP compressor 126) for pressurizing the air that enters the turbomachine 120 through core inlet 124. A high pressure ("HP"), multi-stage, axial-flow compressor (referred to herein as an HP compressor 128) receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to an HP turbine 132. The HP turbine 132 drives the HP compressor 128 through an HP shaft 136. In this regard, the HP turbine 132 is drivingly coupled with the HP compressor 128. The high energy combustion products then flow to an LP turbine 134. The LP turbine 134 drives the LP compressor 126 and components of the fan section 150 through an LP shaft 138. In this regard, the LP turbine 134 is drivingly coupled with the LP compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan. In such a manner, the gas turbine engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the LP turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to the fan cowl 170.

As shown in FIG. 1, in addition to the fan 152, which is unducted, a ducted fan 184 is included aft of the fan 152, such that the gas turbine engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the LP turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the gas turbine engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The gas turbine engine 100 also defines or includes an inlet duct 180. The inlet duct 180 extends between the engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the gas turbine engine 100 includes one or more features to increase an efficiency of a third stream thrust (e.g., a thrust generated by an airflow through the fan duct 172 exiting through the fan exhaust nozzle 178, generated at least in part by the ducted fan 184). In particular, the gas turbine engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the gas turbine engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the gas turbine engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust during one or more engine operating conditions. Further, by introducing a variability in the geometry of the inlet guide vanes 186 and the fan exhaust nozzle 178, the gas turbine engine 100 may be capable of generating more efficient third stream thrust across a relatively wide array of engine operating conditions, including takeoff and climb (where a maximum total engine thrust is generally needed) as well as cruise (where a lesser amount of total engine thrust is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 194 may be positioned in thermal communication with the fan duct 172. For example, one or more heat exchangers 194 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 194 may be an annular heat exchanger extending substantially 360 degrees in the fan duct 172 (e.g., at least 300 degrees, such as at least 330 degrees). In such a manner, the heat exchanger 194 may effectively utilize the air passing through the fan duct 172 to cool one or more systems of the gas turbine engine 100 (e.g., lubrication oil systems, compressor bleed air, electrical components, etc.). The heat exchanger 194 uses the air passing through the fan duct 172 as a heat sink and correspondingly increases the temperature of the air downstream of the heat exchanger 194 and exiting the fan exhaust nozzle 178.

It will be appreciated, however, that the exemplary gas turbine engine 100 is provided by way of example only. In other exemplary embodiments, the gas turbine engine 100 may have any other configuration. For example, in other exemplary embodiments, the turbomachine 120 may have any other number and arrangement of shafts, spools, compressors, turbines, etc. Further, in other exemplary embodiments, the gas turbine engine 100 may alternatively be configured as a ducted turbofan engine (including an outer nacelle surrounding the fan 152 and a portion of the turbomachine 120); as a direct drive gas turbine engine (may not include a reduction gearbox, such as gearbox 155); as a fixed pitch gas turbine engine (may not include a variable pitch fan, such as fan 152); as a two-stream gas turbine engine (may not include the fan duct 172); etc.

Figure 2:
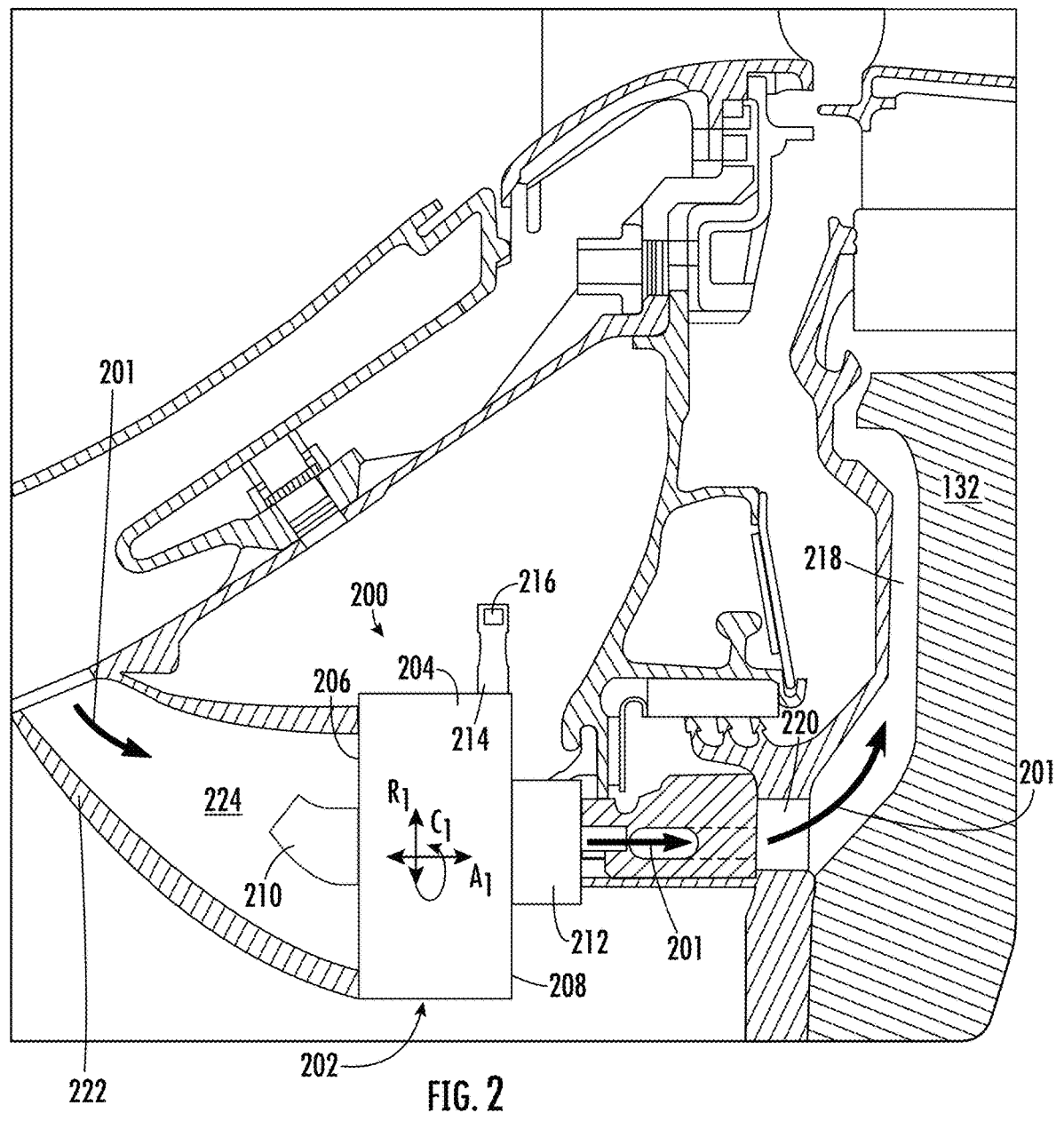
FIG. 2 is a cross-sectional view of a cooling circuit of the gas turbine engine of FIG. 1.

Now referring to FIG. 2, the gas turbine engine 100 includes a cooling circuit 200. The cooling circuit 200 is disposed between the compressor section and the turbine section to provide cooling air 201 from the compressor section to the turbine section. More specifically, the cooling air 201 flows from the HP compressor 128, bypassing the combustor 130, through the cooling circuit 200. The cooling air 201 then flows to the HP turbine 132.

The cooling circuit 200 includes a cyclonic separator 202 to remove impurities from the air, such as dust or debris. The cyclonic separator 202 defines a radial direction R1, an axial direction A1, and a circumferential direction C1. It will be appreciated that the directions R1, A1, C1 of the cyclonic separator 202 are locally defined with respect to the cyclonic separator 202. However, in the embodiment shown, the axial direction A1 is arranged parallel to the axial direction A of the gas turbine engine 100.

The cyclonic separator 202 includes a housing 204 extending from a first end 206 to a second end 208, a fluid inlet 210 disposed at the first end 206 of the housing 204, a first fluid outlet 212 disposed at the second end 208 of the housing 204, and a second fluid outlet 214 extending at least partially outward in the radial direction R1 from the housing 204. The fluid inlet 210 receives air from the compressor section, and the first fluid outlet 212 transmits air to the turbine section. The fluid inlet 210 may be angled relative to the circumferential direction C1 to induce a swirl to the incoming air. As an example, the fluid inlet 210 may be angled between 30 and 70 degrees relative to the circumferential direction C1, and the fluid inlet 210 may be angled clockwise or counterclockwise. The second fluid outlet 214 transmits air containing impurities to an exit flow 216, which is directed away from the combustion section and turbine section. The cooling circuit 200 provides air suitable for cooling one or more components of the gas turbine engine 100, such as the HP turbine 132 and the LP turbine 134.

More specifically, the HP turbine 132 defines a cooling passage 218 and includes an inducer 220 configured to introduce a circumferential swirl to a cooling air provided by the cooling circuit 200 to the cooling passage 218 of the HP turbine 132. In particular, the cooling circuit 200 may receive the cooling air 201 from the compressor section, such as from an exit of the compressor section. The gas turbine engine 100 includes at the combustion section an inner airflow passage 222 located inward of the combustor 130 along the radial direction R of the gas turbine engine 100 and an annular chamber 224. The cooling air 201 is, in the embodiment shown, provided through the inner airflow passage 222 to the annular chamber 224. The cooling air 201 in the annular chamber 224 is provided to the cooling circuit 200 of the present disclosure, where particles within the cooling air 201 are separated out, as described herein. The cleaned cooling air 201 is provided through the inducer 220 and into the cooling passage 218 of the HP turbine 132 to cool the HP turbine 132.

Figure 3B:
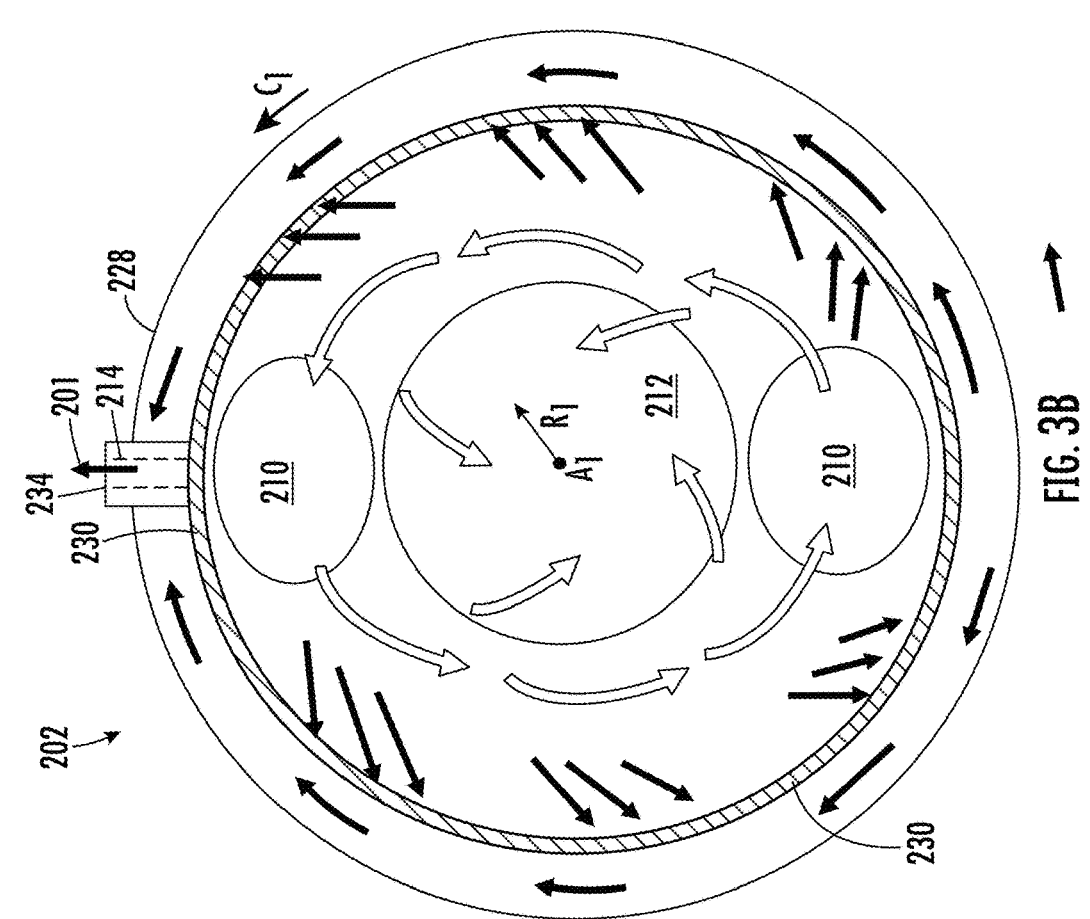
FIGS. 3A-3B are side and axial views of a cyclonic separator of the cooling circuit of FIG. 2.
Figure 3A:
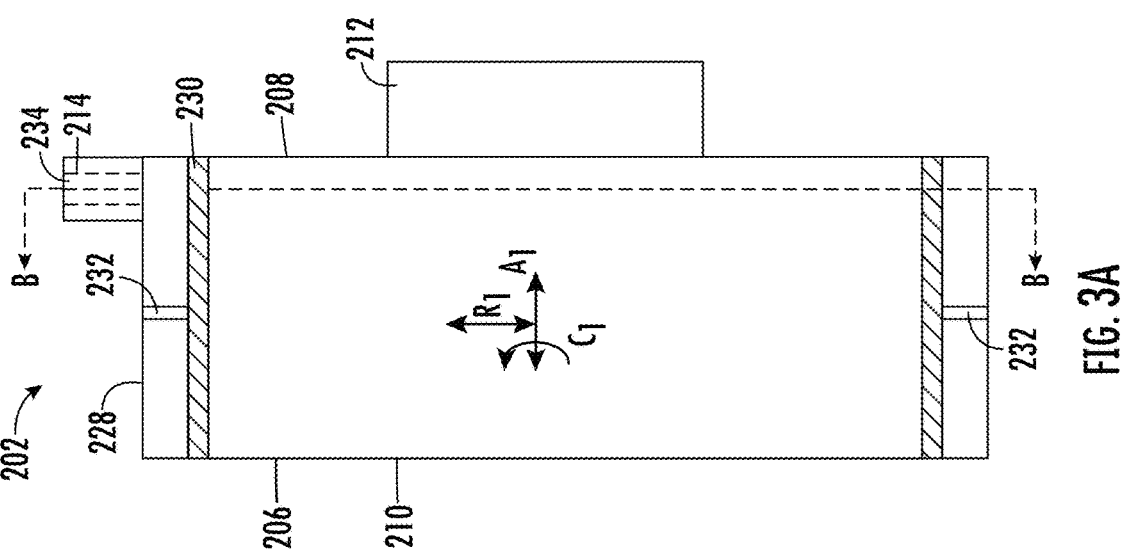

With reference to FIGS. 3A-3B, the cyclonic separator 202 is shown in a cross-sectional view. In particular, FIG. 3A shows a side cross-sectional view of the cyclonic separator 202. FIG. 3B shows a head-on cross-sectional view of the cyclonic separator along the line B-B.

The housing 204 of the cyclonic separator 202 includes an outer wall 228 extending between the first end 206 and the second end 208. The fluid inlet 210 is disposed at the first end 206 and introduces air to the housing 204. The first fluid outlet 212 is disposed at the second end 208 of the housing 204, and the second fluid outlet 214 is disposed in the outer wall 228 downstream of the first end 206.

The cyclonic separator 202 includes a particle separator 230. The particle separator 230 is disposed in the housing 204 between the first end 206 and the second end 208 inward of the outer wall 228 in the radial direction R1. The particle separator 230 extends in the circumferential direction C1 around the center of the housing 204, allowing particulate matter to flow to the outer wall 228 while inhibiting the particulate matter from returning to the center of the housing 204. As described in greater detail below, the particle separator 230 includes one or more openings that allow air and particulate matter to pass therethrough.

As shown in FIG. 3A, the particle separator 230 extends from the first end 206 of the housing to the second end 208 of the housing. In such a form, the housing 204 may support the particle separator 230 at the first end 206, the second end 208, or both. As an example, the particle separator 230 may be welded, fastened, or adhered to the first end 206 or the second end 208.

Alternatively, the particle separator 230 may extend partially between the first end 206 and the second end 208. In such a form, the particle separator 230 is spaced from one of the first end 206 or the second end 208.

Additionally or alternatively, the cyclonic separator 202 may include one or more pins 232 that extend radially from the outer wall 228 to the particle separator 230. The pins 232, if included, fix the particle separator 230 to the outer wall 228, securing the particle separator 230 within the housing 204.

For clarity, air flow within the cyclonic separator 202 is shown with arrows in FIG. 3B, illustrating the movement of air from the fluid inlet 210 to the first and second fluid outlets 212, 214. The fluid inlet 210 is disposed inward of the particle separator 230 in the radial direction R1, and the particulate matter in the air is introduced to the interior of the housing 204 through the fluid inlet 210. In the exemplary embodiment of FIGS. 3A-3B, the cyclonic separator 202 includes two fluid inlets 210, and it will be appreciated that the cyclonic separator 202 may include a different number of fluid inlets 210. The cyclonic separator 202 swirls air from the fluid inlets 210, causing the particulate matter to accumulate radially outward of the particle separator 230 and causing the remaining air to flow to the first fluid outlet 212. More specifically, the fluid inlets 210 are disposed radially outward of the center of the center of the housing 204, which induces a vortex along the center of the housing toward the first fluid outlet 212. This vortex swirls air in the circumferential direction C1.

The second fluid outlet 214 is disposed radially outward of the particle separator 230. The second fluid outlet 214 defines an outlet passage 234 therethrough, and the outlet passage 234 is in fluid communication with the exit flow 216 that removes air from the cyclonic separator 202. As the air swirls in the housing 204, at least some of the particulate matter is pushed by centrifugal forces through the openings of the particle separator 230 to the outer wall 228. Because the openings of the particle separator 230 are in fluid communication with the outlet passage 234 and the exit flow, the particulate matter flows circumferentially around the outer wall 228 and through the outlet passage 234 of the second fluid outlet 214 to the exit flow, removing the particulate matter from the cyclonic separator 202. Meanwhile, the remaining swirling air flows through the housing 204 toward the first fluid outlet 212, having lost at least some of the particulate matter, to the turbine section as described above with reference to FIG. 2.

Figure 4:
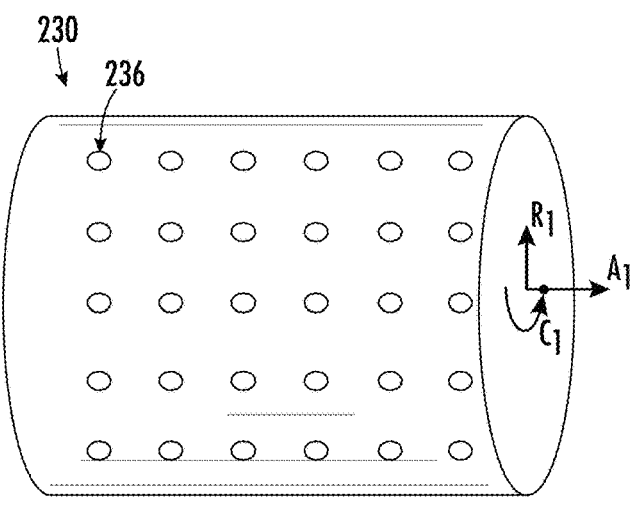
FIG. 4 is a side view of a particle separator of the cyclonic separator of FIGS. 3A-3B.

Now referring to FIG. 4, a schematic view of the particle separator 230 is shown according to one exemplary embodiment of the present disclosure. The exemplary particle separator 230 of FIG. 4 may be incorporated into the cyclonic separator described above with reference to FIGS. 2-3B.

The particle separator 230 defines a plurality of openings 236. When arranged in the cyclonic separator 202, the openings 236 extend in the radial direction R1 toward the outer wall 228 (see FIGS. 3A, 3B). The openings 236 are evenly distributed around the particle separator 230 in the circumferential and axial directions C1, A1, such as in a lattice pattern as shown in FIG. 4.

Alternatively, however, in other exemplary embodiments, the openings 236 may be arranged in a different pattern, such as a staggered configuration. Referring still to FIG. 4, and as will be discussed in greater detail below, the plurality of openings 236 may include a circular opening, an elliptical opening, a polygonal opening, or combinations thereof.

Referring now to FIGS. 5A through 5F, schematic, plan views are provided of particle separators 230 in accordance with various exemplary embodiments of the present disclosure. The exemplary particle separators 230 of FIGS. 5A through 5F may be incorporated into the cyclonic separator 202 described above with reference to FIGS. 2-3B.

As shown in FIGS. 5A-5F, the plurality of openings 236 may be one of several shapes and may be distributed along the particle separator 230 in one of several patterns. For clarity, the term "openings 236" will be used collectively for openings of the particle separator 230 in general, and each of FIGS. 5A-5B may use additional numerals to refer to the specific shapes and patterns of the openings 236 in the particular Figure.

Figure 5A:
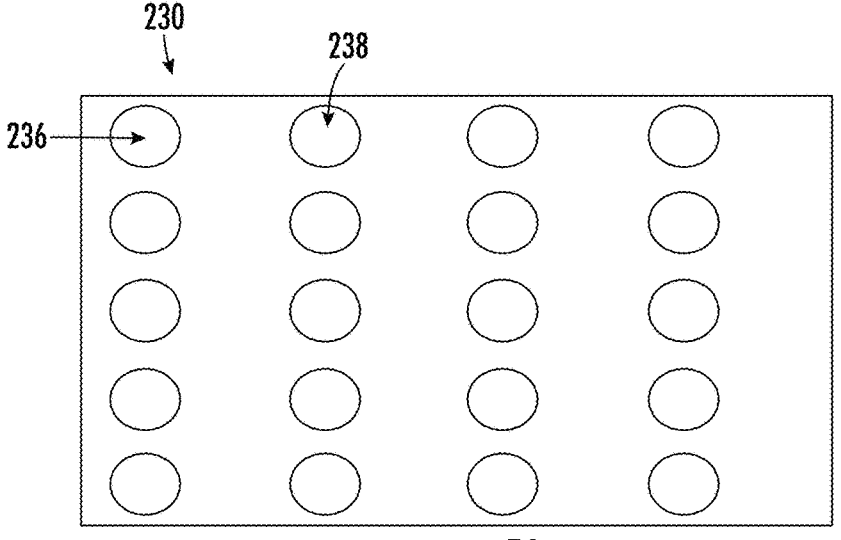
FIGS. 5A-5F are magnified views of exemplary arrangements of openings of the particle separator of FIG. 4.

FIG. 5A shows circular openings 238 arranged in a lattice, i.e., an arrangement where each circular opening 238 is arranged in a rectangular grid, and each of the circular openings 238 is substantially a same size. The lattice arrangement may be easier to manufacture than other arrangements because the spacing between each of the openings 236 is substantially even.

Figure 5B:
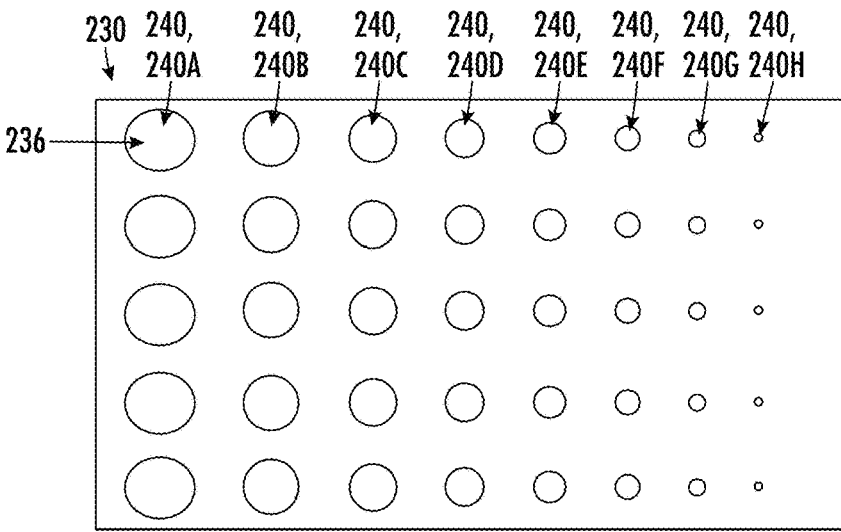

FIG. 5B shows circular openings 240 arranged in the lattice and with decreasing sizes along the axial direction A1. In this arrangement, a first one 240A of the plurality of openings 240 defined in the particle separator 230 at a first position in the axial direction A1 has a size greater than a second one 240B of the plurality of openings 240 defined in the particle separator 230 at a second position in the axial direction A1. In the example of FIG. 5B, the openings 240 decrease in size eight times, illustrating openings 240A, 240B, 240C, 240D, 240E, 240E, 240F, 240G, and 240H.

It will be appreciated, however, that in other exemplary embodiments the particle separator 230 may have a different number of sizes, such as two, four, six, or another number, and that the sizes may increase or decrease at different positions in the axial direction A1, including decreasing and increasing in an uneven or alternating pattern.

Particles that move through the larger openings, such as openings 240A and 240B, may be too large to pass through the smaller openings, such as 240G and 240H. The smaller openings thus inhibit movement of the particles back into the air flow in the center of the cyclonic separator 202, forcing the air flowing with the particles through the second fluid outlet 214.

Figure 5C:
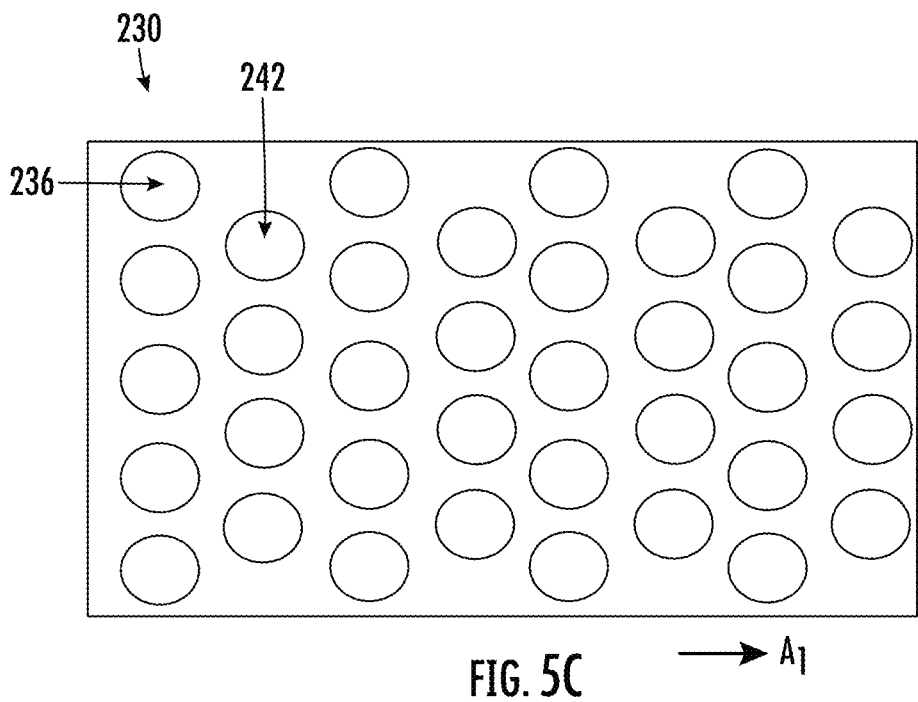

FIG. 5C shows circular openings 242 arranged in a staggered configuration, such that the openings 242 are not aligned with forward adjacent and aft adjacent openings 242 in the axial direction A1. The staggered configuration allows particles that may not pass through openings 242 at one axial position to pass through other openings 242 at a different axial position, increasing a likelihood that the particles pass through at least one of the openings 242 and, thus, through the second fluid outlet 214.

Figure 5D:
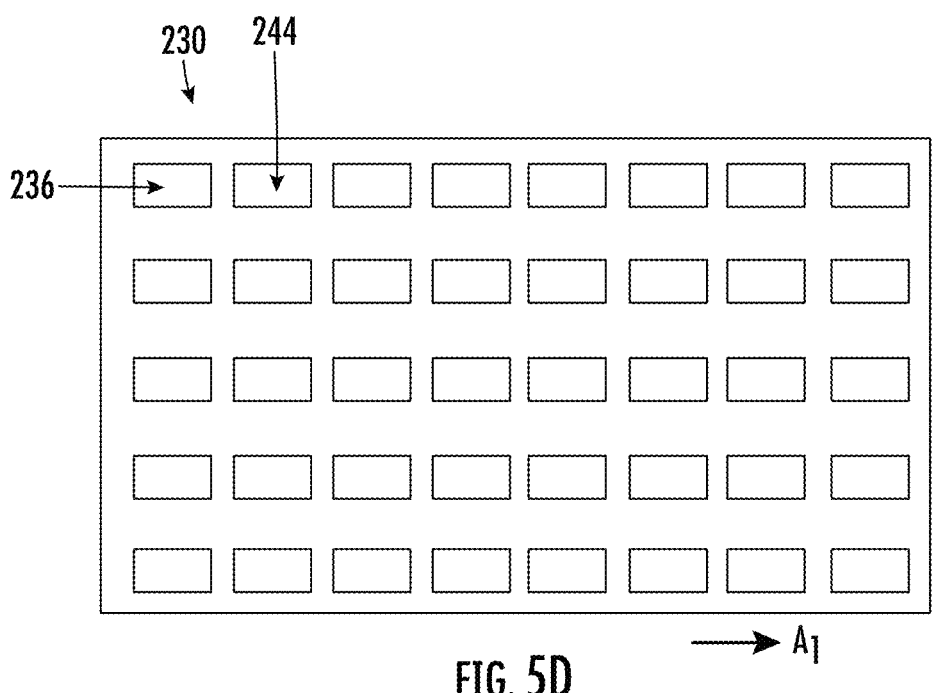
Figure 5E:
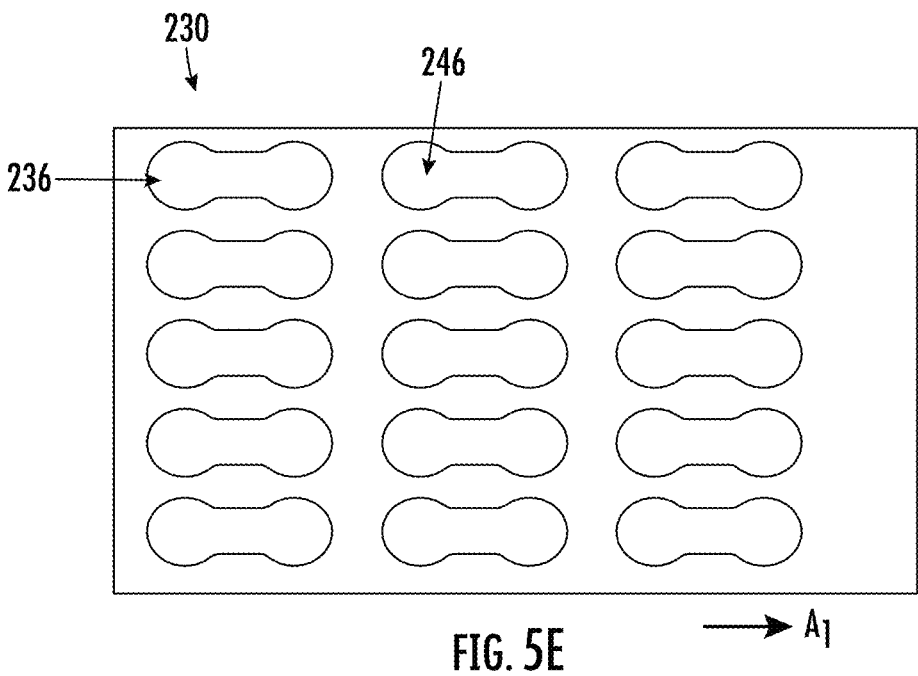

FIG. 5D shows polygonal openings 244, specifically rectangular openings, arranged in a lattice. FIG. 5E shows irregularly shaped openings 246, such as a barbell shape. The polygonal and irregular shapes of the openings 244, 246 may provide advantageous physical properties, such as a specific weight or stress distribution, while removing particles from the air flowing in the cyclonic separator 202.

Figure 5F:
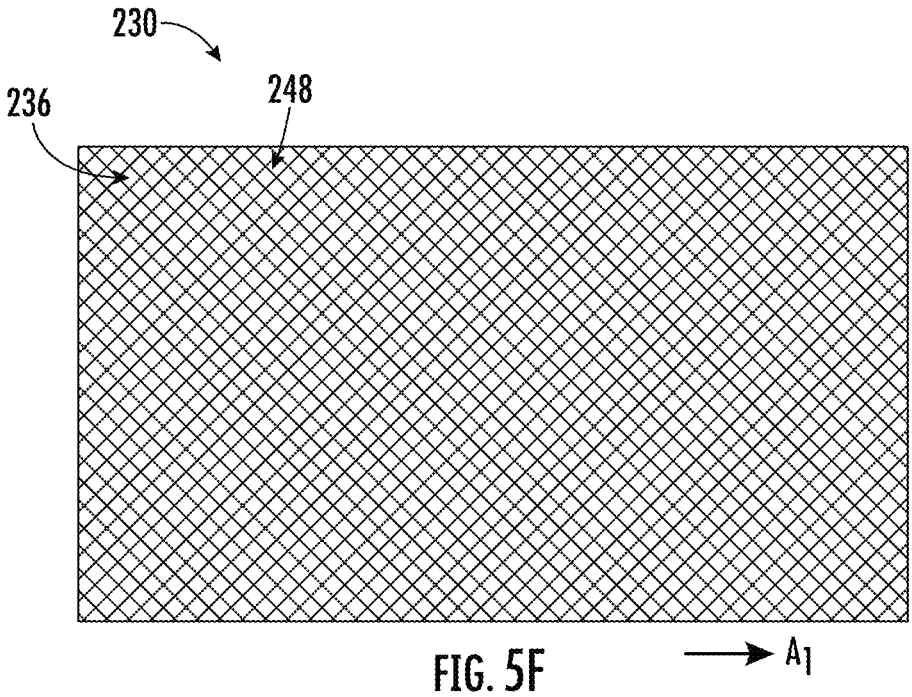

FIG. 5F shows the particle separator 230 as a mesh, with the openings 248 formed between the intersections of the wires that form the mesh. The particle separator 230 may be formed of a prebuilt mesh with a specified opening size, reducing a total amount of manufacturing performed on the particle separator 230. The mesh may also reduce overall weight of the particle separator 230 compared to a cylindrical tube with openings 236 machined therethrough, such as the openings 236, 238, 240, 242, 244, and 246 as shown in FIGS. 5A-5E.

It will be appreciated that the different patterns described herein may be modified, combined, or otherwise adapted to provide suitable particle removal from the air flow.

Figures 6C, 6D, 6E:
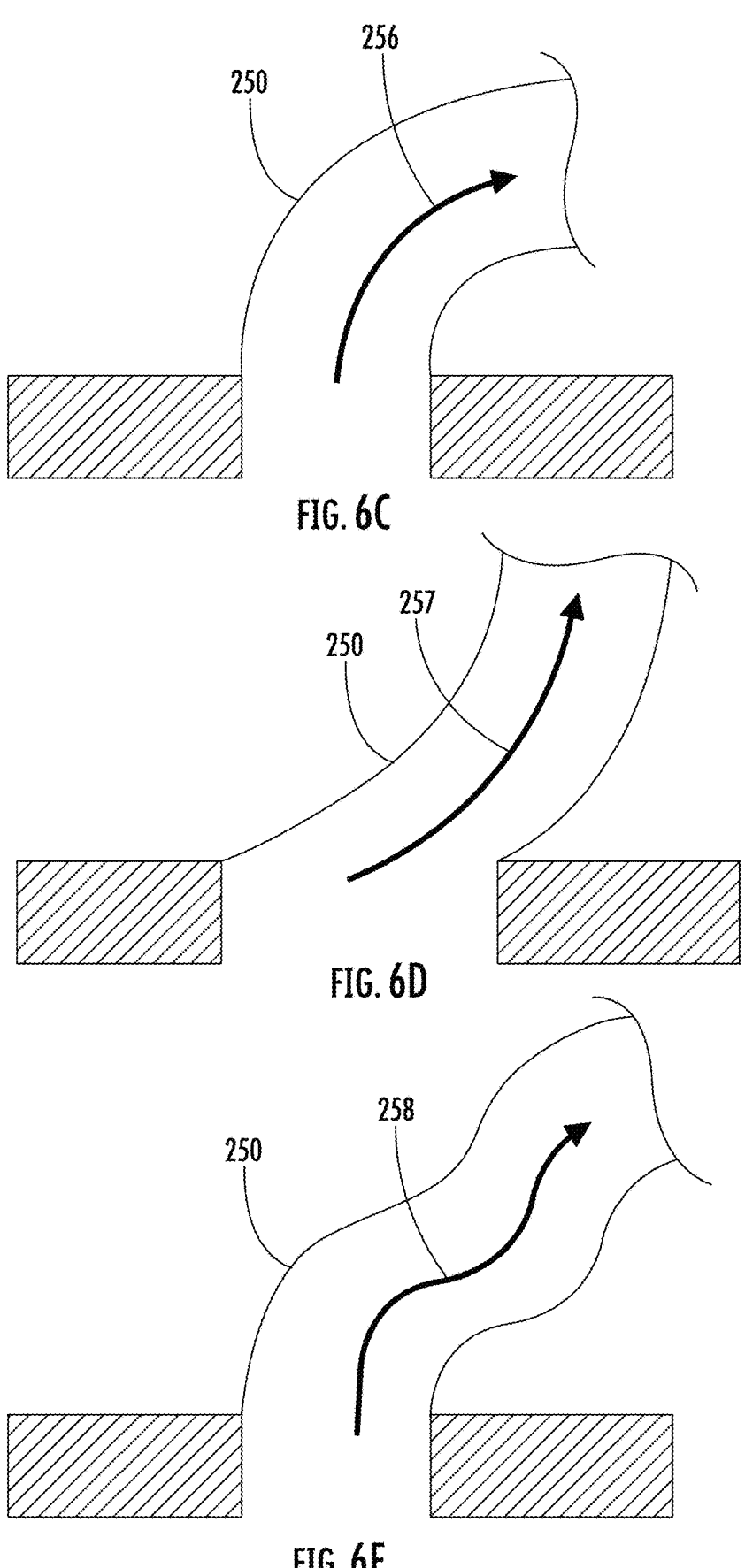

With reference to FIGS. 6A-6E, a cross-sectional view of the particle separator 230 is shown. FIG. 6A provides a view of a particle separator 230 with projections extending radially outward. FIG. 6B provides a view of a particle separator 230 with projections extending radially inward. FIG. 6C is a magnified view of one of the projections of the particle separator 230. FIG. 6D is a magnified view of another one of the projections of the particle separator 230. FIG. 6E is a magnified view of yet another one of the projections of the particle separator 230. The exemplary particle separators 230 of FIGS. 6A and 6B may be configured in substantially the same manner as the exemplary particle separators 230 of FIGS. 2-5F.

Each of the particle separators 230 depicted includes one or more projections 250 extending in a radial direction R1 of a cooling circuit 200 including the respective particle separator 230 (see, e.g., FIGS. 3A, 3B) such that one of the openings 236 is defined through each projection 250. The projection 250 is a tube or passage through which the particles move from the center of the housing 204 to the outer wall 228. To assist in moving the particles from the center and to inhibit the particles from moving back into the center, the projection 250 defines an angle 252 with a centerline 254 of the housing 204. The projection 250 changes trajectories of the particles to move outward in the radial direction R1, reducing or eliminating particle movement back into the center. More specifically, particles that move along the projection 250 may be propelled outward in the radial direction R1 and forward in an axial direction A1 of the cooling circuit 200 (see, e.g., FIGS. 3A, 3B), bouncing off of an outer wall 228 of the cooling circuit 200 back inward in the radial direction R1. Because the projection 250 is angled forward in the axial direction A1, the particles that bounce off of the outer wall 228 are less likely to move back down into the opening 236, a trajectory that would include rearward motion in the axial direction A1. By providing momentum for the particles forward in the axial direction A1, fewer particles return to the center of the housing 204 and more particles are removed from the cyclonic separator 202. The angle 252 may be an acute angle, i.e., less than 90 degrees, to achieve this trajectory-changing feature.

FIG. 6A shows the projections 250 extending outward in the radial direction R1 toward the outer wall 228 of the cooling circuit 200. The projections 250 extending outward from the particle separator extend partway toward the outer wall 228 to direct particles thereto.

By contrast, FIG. 6B shows the projections 250 extending inward in the radial direction R1 away from the outer wall 228 of the cooling circuit 200. The projections 250 receive particles from the center of the housing 204 and direct the particles toward the outer wall 228.

Now referring to FIGS. 6C-6E, the projections 250 may have different shapes than the straight projections 250 shown in FIGS. 6A-6B. As shown in FIG. 6C, a projection 250 may extend along a convex curved path 256. The convex curved path 256 directs the particles in a downstream direction away from the particle separator 230.

As shown in FIG. 6D, a projection 250 may extend along a concave curved path 257. The concave curved path 257 directs the particles radially away from the particle separator 230.

As shown in FIG. 6E, a projection 250 may extend along a serpentine path 258. The serpentine path 258 directs the particles radially away and in a downstream direction away from the particle separator 230.

It will be appreciated that the particle separator 230 may include projections 250 extending at different angles 252 and extending toward the outer wall 228, away from the outer wall 228, with different curved paths 256, 257, 258, or combinations thereof, and that some or all of openings 236 of the particle separator 230 may extend through one of the projections 250.

Figure 7A:
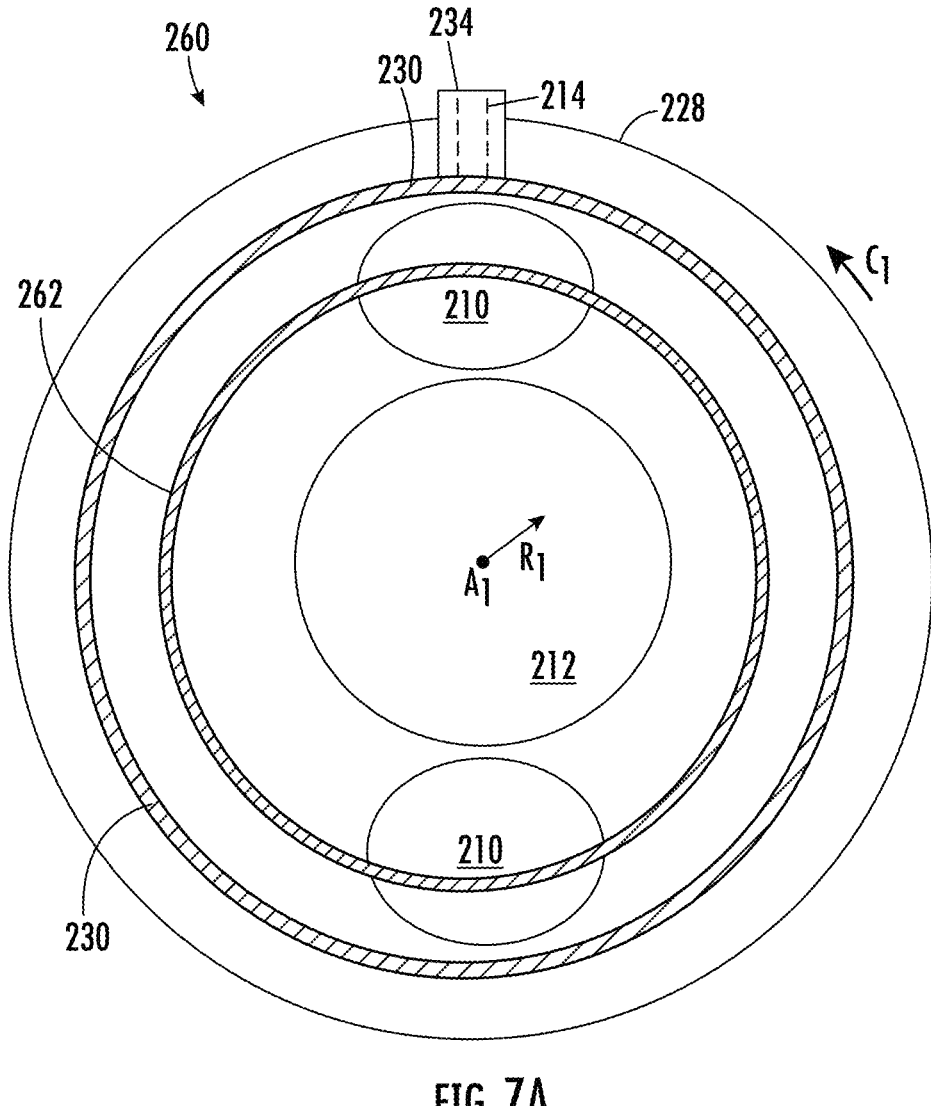
FIGS. 7A-7C are cross-sections view of additional exemplary particle separators of a cyclonic separator.

Now referring to FIG. 7A, a cross-sectional view of another cyclonic separator 260 is shown. The cyclonic separator 260 of FIG. 7A includes a particle separator 230 and a second particle separator 262. The second particle separator 262 is disposed radially inward of the particle separator 230. The second particle separator 262 includes a plurality of openings (not shown) that allow particles to pass therethrough. The openings of the second particle separator 262 may differ from the openings of the particle separator 230 to filter different sizes of particles. For example, the particle separator 230 may include openings having a first size, and the second particle separator 262 may include openings having a second size that is greater than the first size. In such a form, larger particles pass through the openings of the second particle separator 262 but are blocked from returning to the center of the cyclonic separator 260 by the smaller openings of the particle separator 230.

Figure 7B:
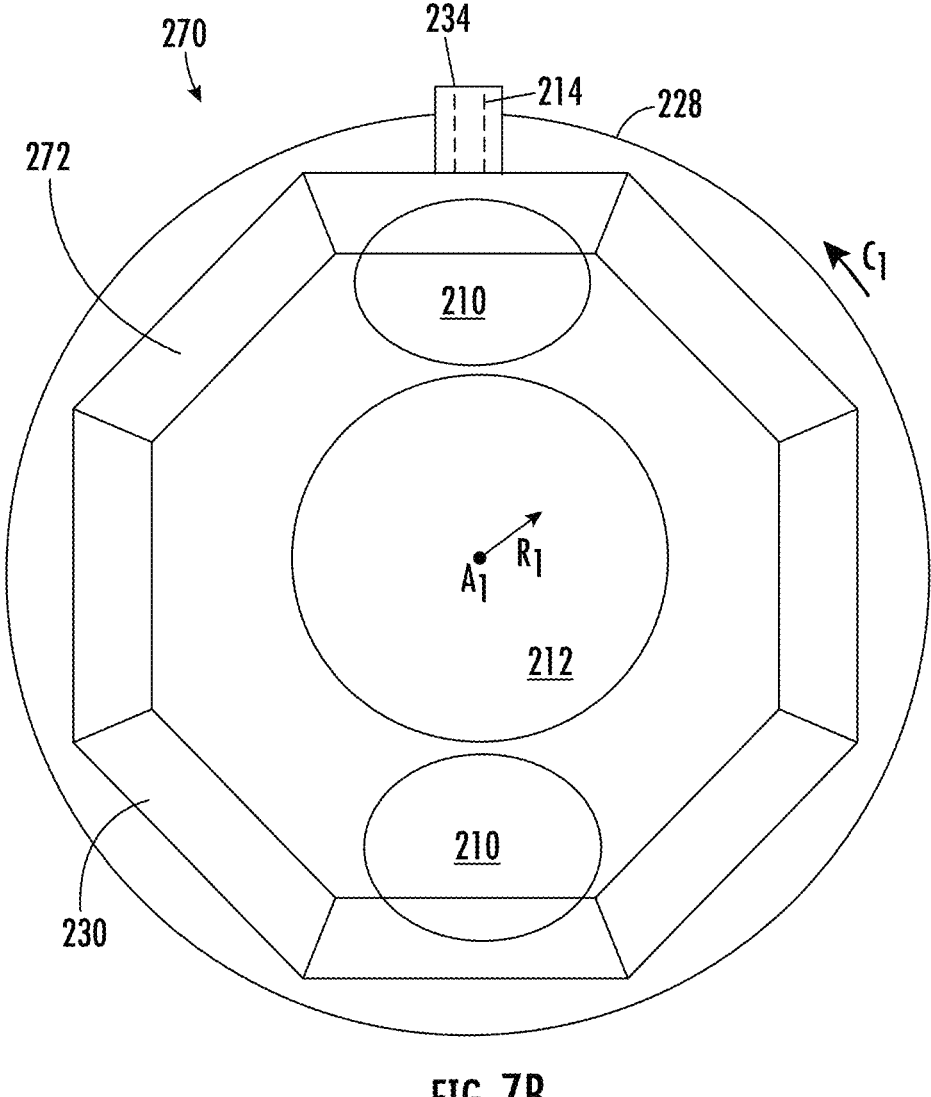

Now referring to FIG. 7B, a cross-sectional view of another cyclonic separator 270 is shown. The cyclonic separator 270 includes a particle separator 272 having an octagonal shape. The octagonal shape of the particle separator 272 allows for different air flow patterns in the cyclonic separator 270. It will be appreciated that the particle separator 272 may have a different polygonal shape, such as a square shape, a triangular shape, a hexagonal shape, or a shape with a different number of sides.

Figure 7C:
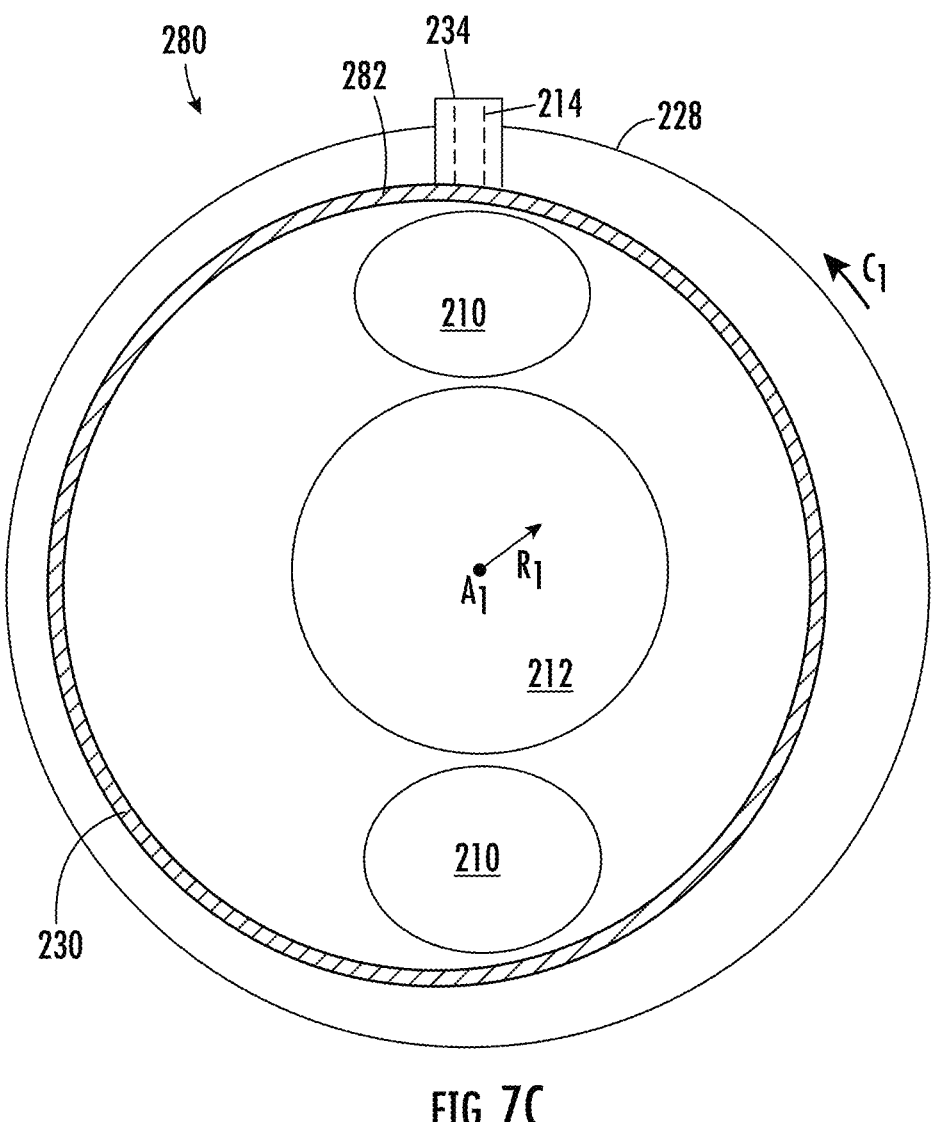

With reference to FIG. 7C, a cross-sectional view of another cyclonic separator 280 is shown. The cyclonic separator 280 includes a particle separator 282. The particle separator 282 is disposed in the cyclonic separator 280 such that a center of the particle separator 282 is spaced away from a center of an outer wall 228 of the cyclonic separator 280. That is, the particle separator 282 and the outer wall 228 are not concentric. By disposing the particle separator 282 off-center relative to the outer wall 228, the particle separator 282 may filter particles that accumulate in specific sections of the cyclonic separator 280. More specifically, based on the direction of the flow of cooling air 201 in the cyclonic separator 280, particles may preferentially accumulate in specific regions. In order to filter the particles more readily, the particle separator 282 may be disposed off-center into the specific regions.

Figure 8:
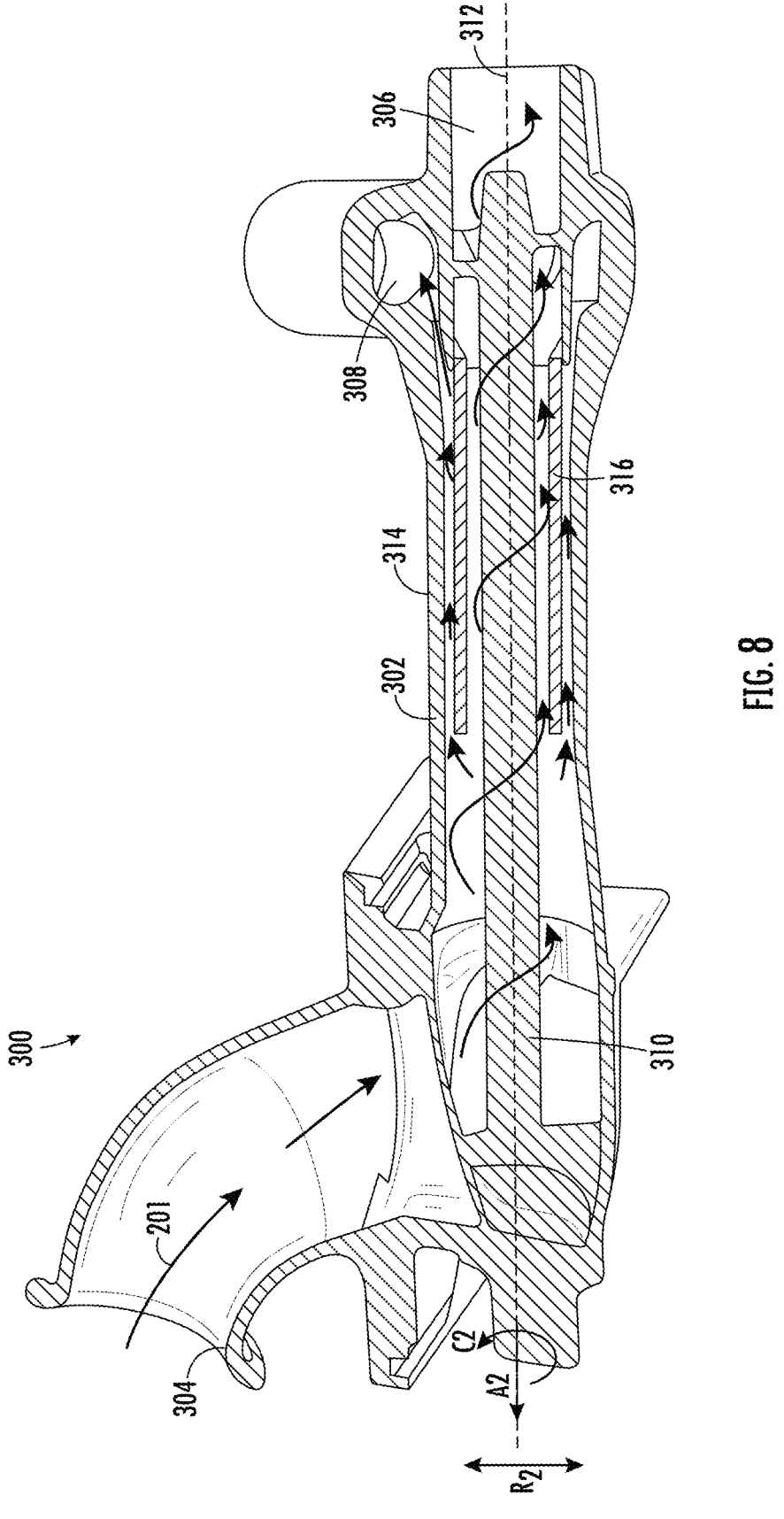
FIG. 8 is another exemplary cyclonic separator for a cooling circuit.

Now referring to FIG. 8, another exemplary embodiment of the cyclonic separator 300 is shown. In particular, FIG. 8 provides a cross-sectional schematic view of the cyclonic separator 300.

In the embodiment of FIG. 8, the cyclonic separator 300 defines a radial direction R2, an axial direction A2, and a circumferential direction C2. The cyclonic separator 300 includes a housing 302, and the housing 302 includes a fluid inlet 304, a first fluid outlet 306, a second fluid outlet 308, a central body 310 along a centerline 312 of the cyclonic separator 300, and an outer wall 314. It will be appreciated that similarly named components of the cyclonic separator 300 perform similar functions to those in the cyclonic separator 202, and the numerals used for the cyclonic separator 300 differ from those for the cyclonic separator 202 only for clarity.

The cyclonic separator 300 includes a particle separator 316 disposed between the central body 310 and the outer wall 314. The central body 310 swirls the cooling air 201 from the fluid inlet 304 through the housing 302 about the centerline 312 to the first fluid outlet 306. The swirling of the air flow causes particles to move through the particle separator 316 toward the outer wall 314 to the second fluid outlet 308, and then out from the cyclonic separator 300. Specifically, the particle separator 316 may be fixed to the first fluid outlet 306 such that the swirled cooling air 201 flowing around the central body 310 passes over or through the particle separator 316 before reaching the first fluid outlet 306. The position of the particle separator 316 is determined to increase particle movement to the second fluid outlet 308, removing the particles from the swirled air flow that exits the cyclonic separator 300 through the first fluid outlet 306.

Notably, the cyclonic separator 300 may be positioned in a gas turbine engine at a similar location as the cyclonic separator 202 of the cooling circuit 200 of FIG. 2. In such a manner, the cyclonic separator 300 may receive cooling air from a compressor section of the gas turbine engine through the fluid inlet 304 and may provide cooling air 201 to a turbine of a turbine section of the gas turbine engine 100 from the first fluid outlet 306. The second fluid outlet 308 may exhaust the particle-laden air to an ambient location with an exit flow 216.

The particle separator 316 may have a similar construction and may include one or more of the features described for the particle separator 230 in FIGS. 5A-7C, including sizes and shapes of openings 236 and projections 250 that are suitable for removal of the particulate matter from the air flow. By including the central body 310 in the cyclonic separator 300, the air flow swirls in a different manner than the cyclonic separator 202 of FIGS. 3A-3B, which may be suitable for specific cooling applications.

As disclosed in the FIGS. and described above, the cyclonic separator swirls air in cyclic motion, applying centrifugal force on particulate matter in air flowing therethrough. The centrifugal forces push the particulate matter to a radial edge of the cyclonic separator through a particle separator that reduces or inhibits the particulate matter from flowing back into a center of the cyclonic separator. Upon moving through the particle separator, an exit flow removes the particulate matter from the cyclonic separator, leaving cleaned air to flow to a fluid outlet. The cleaned air exits the cyclonic separator to cool the components of the gas turbine engine.

Further aspects are provided by the subject matter of the following clauses:

A cyclonic separator for a turbine cooling airflow of a gas turbine engine defines a centerline, an axial direction, a radial direction, and a circumferential direction. The cyclonic separator includes a housing comprising a first end, a second end, and an outer wall extending between the first end and the second end, a fluid inlet disposed at the first end of the housing, a first fluid outlet disposed at the second end of the housing opposing the first end in the axial direction, a second fluid outlet disposed in the outer wall downstream of the first end of the housing, the second fluid outlet extending outward at least partially in the radial direction relative to the outer wall, and a particle separator disposed in the housing between the first end and the second end inward of the outer wall in the radial direction, the particle separator extending in the circumferential direction. The particle separator defines a plurality of openings extending in the radial direction toward the outer wall.

The cyclonic separator of the previous clause, wherein the housing further includes a central body, wherein the particle separator is disposed between the central body and the outer wall.

The cyclonic separator of any of the previous clauses, wherein the second fluid outlet defines an outlet passage in fluid communication with an exit flow, and wherein the plurality of openings of the particle separator are in fluid communication with the outlet passage.

The cyclonic separator of any of the previous clauses, wherein the particle separator extends from the first end of the housing to the second end of the housing.

The cyclonic separator of any of the previous clauses, wherein the plurality of openings includes a circular opening, an elliptical opening, a polygonal opening, or a combination thereof.

The cyclonic separator of any of the previous clauses, wherein the particle separator is a mesh.

The cyclonic separator of any of the previous clauses, wherein a first one of the plurality of openings defined in the particle separator at a first position in the axial direction has a size greater than a second one of the plurality of openings defined in the particle separator at a second position in the axial direction.

The cyclonic separator of any of the previous clauses, wherein the particle separator further comprises a projection extending in the radial direction, wherein at least one of the plurality of openings is defined through the projection.

The cyclonic separator of any of the previous clauses, wherein the projection defines an angle with the centerline that is less than 90 degrees.

The cyclonic separator of any of the previous clauses, wherein the gas turbine engine includes a turbine section including a turbine having a cooling passage, and wherein the first fluid outlet disposed at the second end of the housing is configured to be fluidly connected to the cooling passage of the turbine.

The cyclonic separator of any of the previous clauses, wherein the plurality of openings are evenly distributed around the particle separator in the circumferential direction.

The cyclonic separator of any of the previous clauses, wherein the plurality of openings are evenly distributed along the particle separator in the axial direction.

The cyclonic separator of any of the previous clauses, wherein the fluid inlet is disposed inward of the particle separator in the radial direction.

A gas turbine engine includes a compressor section, a turbine section downstream of the compressor section, and a cyclonic separator between the compressor section and the turbine section. The cyclonic separator defines an axial direction, a radial direction, and a circumferential direction. The cyclonic separator includes a housing comprising a first end, a second end, and an outer wall extending between the first end and the second end, a fluid inlet disposed at the first end of the housing and fluidly connected to the compressor section, a first fluid outlet disposed at the second end of the housing opposing the first end in the axial direction and fluidly connected to the turbine section, a second fluid outlet disposed in the outer wall downstream of the first end, the second fluid outlet extending outward at least partially in the radial direction relative to the outer wall and fluidly connected to an exit flow directed away from the turbine section, and a particle separator disposed in the housing between the first end and the second end inward of the outer wall in the radial direction, the particle separator extending in the circumferential direction. The particle separator defines a plurality of openings extending in the radial direction toward the outer wall.

The gas turbine engine of any of the previous clauses, wherein the housing further includes a central body, wherein the particle separator is disposed between the central body and the outer wall.

The gas turbine engine of any of the previous clauses, wherein the plurality of openings includes a circular opening, an elliptical opening, a polygonal opening, or a combination thereof.

The gas turbine engine of any of the previous clauses, wherein the particle separator is a mesh.

The gas turbine engine of any of the previous clauses, wherein the particle separator further comprises a projection extending in the radial direction, wherein at least one of the plurality of openings is defined through the projection.

The gas turbine engine of any of the previous clauses, wherein the projection defines an angle with a centerline of the cyclonic separator that is less than 90 degrees.

The gas turbine engine of any of the previous clauses, wherein the turbine section comprises a turbine having a cooling passage, and wherein the first fluid outlet disposed at the second end of the housing is fluidly connected to the cooling passage of the turbine.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cyclonic separator for a turbine cooling airflow of a gas turbine engine, the cyclonic separator defining a centerline, an axial direction, a radial direction, and a circumferential direction, the cyclonic separator comprising:
   a housing comprising a first end, a second end opposing the first end in the axial direction, and an outer wall extending between the first end and the second end; and
   a particle separator disposed in the housing between the first end and the second end inward of the outer wall in the radial direction, the particle separator extending in the circumferential direction, wherein the particle separator extends from the first end of the housing to the second end of the housing,
   wherein the particle separator defines a plurality of openings extending in the radial direction toward the outer wall.

2. The cyclonic separator of claim 1, wherein the housing further comprises a central body, wherein the particle separator is disposed between the central body and the outer wall.

3. The cyclonic separator of claim 1, wherein the plurality of openings includes a circular opening, an elliptical opening, a polygonal opening, or a combination thereof.

4. The cyclonic separator of claim 1, wherein the particle separator is a mesh.

5. The cyclonic separator of claim 1, wherein a first one of the plurality of openings defined in the particle separator at a first position in the axial direction has a size greater than a second one of the plurality of openings defined in the particle separator at a second position in the axial direction.

6. The cyclonic separator of claim 1, wherein the particle separator further comprises a projection extending in the radial direction, wherein at least one of the plurality of openings is defined through the projection.

7. The cyclonic separator of claim 6, wherein the projection defines an angle with the centerline that is less than 90 degrees.

8. The cyclonic separator of claim 1, wherein the particle separator has a polygonal shape.

9. The cyclonic separator of claim 1, wherein the particle separator defines a center, wherein the particle separator is disposed in the cyclonic separator such that the center of the particle separator is spaced away from a center of the outer wall.

10. The cyclonic separator of claim 1, further comprising a second particle separator disposed radially inward of the particle separator.

11. The cyclonic separator of claim 1, further comprising a fluid inlet configured to swirl incoming air into the housing.

12. The cyclonic separator of claim 11, wherein the fluid inlet is angled between 30 and 70 degrees relative to the circumferential direction.

13. A gas turbine engine comprising:
a compressor section;
a turbine section downstream of the compressor section; and a cyclonic separator between the compressor section and the turbine section, the cyclonic separator defining an axial direction, a radial direction, and a circumferential direction, the cyclonic separator comprising:
a housing comprising a first end, a second end opposing the first end in the axial direction, and an outer wall extending between the first end and the second end; and
a particle separator disposed in the housing between the first end and the second end inward of the outer wall in the radial direction, the particle separator extending in the circumferential direction,
wherein the particle separator defines a plurality of openings extending in the radial direction toward the outer wall.

14. The gas turbine engine of claim 13, wherein the housing further comprises a central body, wherein the particle separator is disposed between the central body and the outer wall.

15. The gas turbine engine of claim 13, wherein the plurality of openings includes a circular opening, an elliptical opening, a polygonal opening, or a combination thereof.

16. The gas turbine engine of claim 13, wherein the particle separator is a mesh.

17. The gas turbine engine of claim 13, wherein the particle separator further comprises a projection extending in the radial direction, wherein at least one of the plurality of openings is defined through the projection.

18. The gas turbine engine of claim 17, wherein the projection defines an angle with a centerline of the cyclonic separator that is less than 90 degrees.

19. The gas turbine engine of claim 13, wherein the turbine section further comprises a cooling passage including an inducer configured to introduce a swirl in the circumferential direction to air flowing into the cyclonic separator.

* * * * *